US007941274B1

(12) United States Patent
Estupinan et al.

(10) Patent No.: US 7,941,274 B1
(45) Date of Patent: May 10, 2011

(54) ADVANCED VERIFICATION INFORMATION FOR IMPROVED OPERATIONAL RESULTS

(75) Inventors: Jeral Garcia Estupinan, Atlanta, GA (US); Joseph Paul Koval, Atlanta, GA (US)

(73) Assignee: The Weather Channel, LLC, Atlanta, GA (US)

( * ) Notice: Subject to any disclaimer, the term of this patent is extended or adjusted under 35 U.S.C. 154(b) by 913 days.

(21) Appl. No.: 11/499,204

(22) Filed: Aug. 3, 2006

(51) Int. Cl.
*G06F 19/00* (2011.01)
*G01W 1/00* (2006.01)
(52) U.S. Cl. .......................... 702/3; 73/170.16
(58) Field of Classification Search .............. 702/3, 1–2, 702/16–17, 81, 84, 182, 187–188; 73/170.16–170.18, 170.21, 170.26; 345/428, 345/440, 440.1–440.2, 619, 629–630, 650, 345/661, 676, 689
See application file for complete search history.

(56) References Cited

U.S. PATENT DOCUMENTS

| 4,218,755 | A * | 8/1980 | Root ............................... 702/3 |
| 6,584,447 | B1 * | 6/2003 | Fox et al. ........................ 705/10 |
| 7,107,152 | B2 * | 9/2006 | Fixman ............................ 702/3 |

OTHER PUBLICATIONS

Leon et al., An Intelligent User Interface to Support Weather Report Generation, Feb. 2002, Weather and Forecasting, vol. 17, pp. 115-123.*
Ebert et al., A Real Time Forecast Verification System, Sep. 5-9, 2005, WWRP Symposium on Nowcasting and Very Short Range Forecasting.*
Mass, C.F., "Forecaster's Forum IFPS and the Future of the National Weather Service", *American Meteorological Society*, 2003, 18, 75-79.
Nelson, S.E. et al., "Coach: Initial Results from an Operational Performance Support System at the Tulsa WFO", *Proceedings of the 15th Conference on IIPS for Met., Ocean., and Hyd.*, Dallas, Texas, 2001, 1.5-1.8.
Ryan, J.C. et al., "Mentor-A Performance Support System for Forecasters", *19th Conference on IIPS, American Meteorological Society*, Long Beach, Ca., USA, 7.5-7.8, 2003.

* cited by examiner

*Primary Examiner* — Michael P Nghiem
*Assistant Examiner* — Toan M Le
(74) *Attorney, Agent, or Firm* — Lawrence A. Aaronson, PC

(57) ABSTRACT

To provide human forecasters with monitoring and verification tools to know when a machine-generated forecast may already be good enough for public use or to know when to intervene to improve a forecast. Performance support systems and methods that deliver real-time feedback of previous forecasts and forecast accuracy in order to optimize the human forecaster's effectiveness. The systems and methods allow human forecasters to receive feedback from an array of different comparison products, including verification information, forecast discussions and forecast tools, in order to learn from previous forecast performance during similar situations so that human forecasters can focus their energies and resources to those tasks that they can add value to or over machine-generated forecasts. As such, the systems and methods of the present invention allow human forecasters to improve machine-generated forecasts and provide improved operational results.

14 Claims, 11 Drawing Sheets

(9 of 11 Drawing Sheet(s) Filed in Color)

Figure 5
Temperature
Verification
Maps - 14
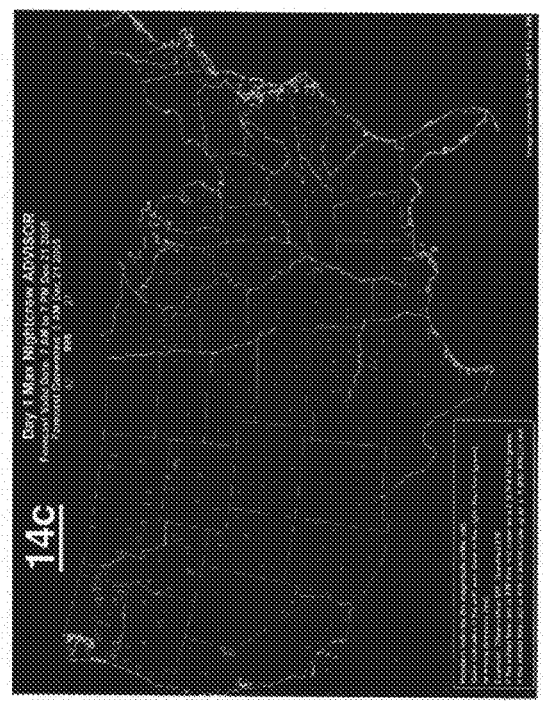
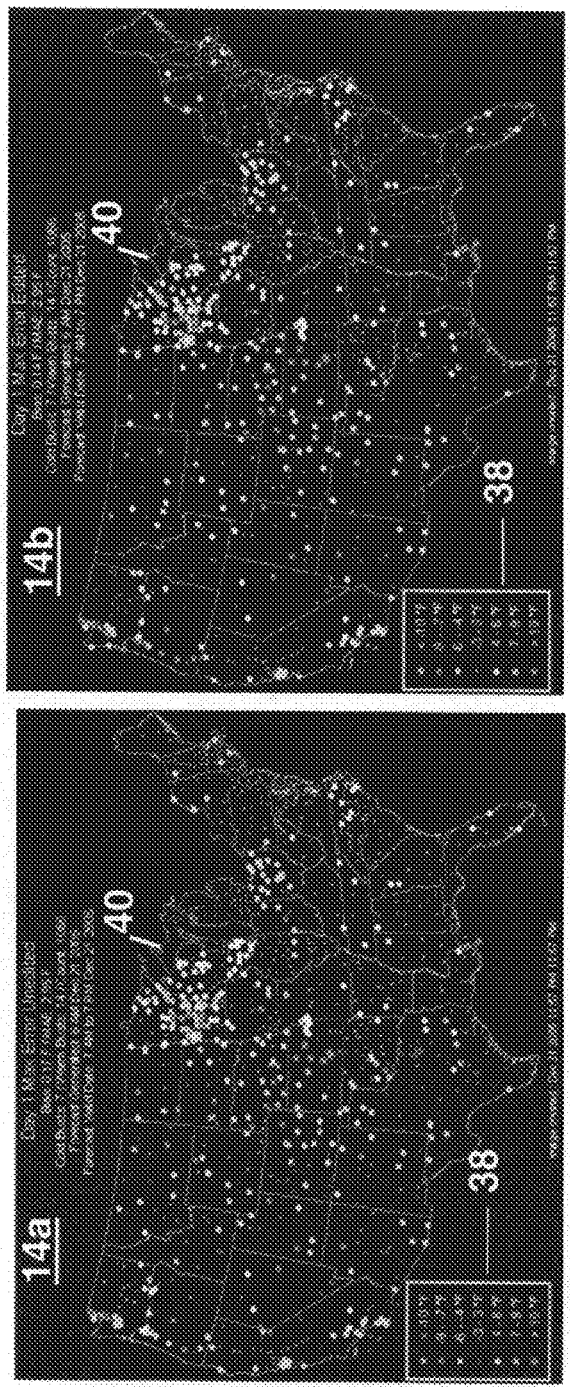

Temperature verification map showing the value added by the human intervention

Temperature Maps + Ensemble spread forecast tool map

Ensemble spread forecast tool map

ADVANCED VERIFICATION INFORMATION FOR IMPROVED OPERATIONAL RESULTS

FIELD OF THE INVENTION

The file of this patent contains at least one drawing executed in color. Copies of this patent with color drawings will be provided by the Office upon request and payment of the necessary fee.

The present invention relates in general to the field of weather observations and forecasting. More particularly, this invention relates to systems and methods that present and use verification information from past forecast performance to allow weather forecasters to learn and identify weather situations where human forecasters can add value over machine-generated forecasts.

BACKGROUND OF THE INVENTION

Throughout the weather forecasting enterprise, increased computing power and automated numerical weather-prediction guidance is challenging the traditional role of the human forecaster. In many cases, automated forecast methods handle day-to-day weather forecasting scenarios quite well, with little or no human intervention necessary.

In forecasting situations where weather conditions vary greatly from climatological normals, however, automated methods often fall short. In these situations, human intervention may play a major role in the forecast process and the accuracy of forecasts, such as identifying anomalous events that may have a high impact on the consumer public.

Therefore, a need exists to identify and train forecasters to recognize those situations where human forecasters should focus their attention and energies to improve upon the automated guidance. There is also a need for a real time monitoring and verification system that provides verification information to forecasters so that forecasters can focus their efforts to those weather situations where human intervention can add value to the computer model guidance.

SUMMARY OF THE INVENTION

The present invention is directed to systems and methods for determining and presenting weather verification information to human forecasters for improved weather operational results. An exemplary system includes a database storing weather parameter information of past weather situations for a geographic region and a time period of interest. A processor may access the past weather parameter information and may determine past verification information. A display may be used to present verification information for more than one weather parameter to a human forecaster. The displayed information may be used by the human forecaster to compare past verification formation to a present weather situation. This comparison allows human forecasters to determine whether to intervene to edit a machine-generated forecast for the present weather situation.

According to another aspect of the present invention, the weather parameter information may include: unedited past weather parameter information, edited past weather parameter information, and/or observed past weather information.

According to another aspect of the present invention, the verification information may include: a comparison of unedited, machine-generated forecasts to observed conditions; and/or a comparison of edited, human-intervened forecasts to observed conditions.

According to another aspect of the present invention, the displayed past verification information includes feedback from an array of different comparison products that may be used by a human forecaster to improve a weather forecast. The array of different comparison products may include: precipitation verification information; temperature verification information; computer model guidance information; high impact verification information, and/or forecast discussions. The verification information may be displayed in a map format. Displayed verification maps preferably represent a relatively large geographic region of interest.

According to another aspect of the present invention, precipitation verification information may include precipitation verification maps displaying information on the performance of sensible weather and/or Qualitative Precipitation Forecast (QPF) for past weather situations.

According to another aspect of the present invention, temperature verification information may include temperature verification maps displaying information on the performance of temperature for past weather situations.

According to another aspect of the present invention, computer model guidance information may include computer model guidance maps displaying technical information about the state of the atmosphere that was used at the time that the forecasts were generated with the same information that may be valid at the time of validation.

According to another aspect of the present invention, high impact verification information may include high impact verification results of the geographic regions where weather made a high impact on the consumer public.

According to another aspect of the present invention, forecast discussions may include narrative entered by a human forecaster that may be classified and archived to the verification for each of the forecast days allowing a human forecaster to review and relate a forecast logic with the results of the verification.

According to another aspect of the present invention, the system and methods also include forecast tools that may be presented to a human forecaster via the display device. The forecast tools compare different forecasting models and look to the agreement and/or disagreement of the different forecasting models at the time of making a forecast. The forecasting tools may be used by a human forecaster as a tool in deciding whether or not to edit a machine-generated forecast for a present weather situation.

According to another aspect of the present invention, a map displaying a numerical representation of the effect of an edit to a machine-generated forecast by a human forecaster is provided. The numerical representation includes a magnitude that may be: (1) a positive number if the edited value of the weather parameter was above the machine-generated weather parameter, or (2) a negative number if the edited value of the weather parameter was below the machine-generated weather parameter. The numerical representation may also include a color code to indicate whether the edit moved the forecast in the right direction, wherein a first color indicates that the edit moved the forecast in the right direction and improved the forecast, and a second color indicates that the edit moved the forecast in the wrong direction and made the forecast worse.

According to another aspect of the present invention, the system further includes ensemble spread information that may be used by a human forecaster as a forecast tool to identify potential areas of interest to intervene and possibly edit machine-generated forecasts. The ensemble spread information may include a map of a geographic region of interest and a spread of forecasts from computer models presented over the map. The spread of forecasts may be represented as standard deviation of one or more weather parameters being forecasted by the models. A low standard deviation between the computer models is indicative of agreement between the models, and a high standard deviation between the models is indicative of disagreement between the models. Areas showing disagreement between the models would identify potential areas of interest to human forecasters.

According to another embodiment of the present invention, a method for delivering real-time feedback of weather forecast accuracy in order to maximize the human forecaster's effectiveness is provided. The method includes determining past forecast performance by comparing observed weather information to: (1) unedited, machine-generated past forecast information, and/or (2) edited, human-intervened past forecast information, and displaying results of the comparison for use by one or more human forecasters in deciding whether to intervene to edit a machine-generated forecast for a present weather situation.

According to another aspect of the present invention, the step of determining past forecast performance further comprises two or more of: providing forecaster's discussion of prior forecast logic during a past time period for a geographic region of interest; providing one or more comparison products comprising verification information of prior forecast performance during a past time period for a geographic region of interest in the context of observed weather conditions; and/or providing one or more forecast tools comprising forecast information from at least two forecasting models during a time period for making a forecast for a geographic region of interest.

According to another aspect of the present invention, the method includes directing the human forecaster's attention to geographic areas wherein intervention by the human forecaster may contribute to and add value to the machine-generated forecast for a present weather situation by highlighting one or more geographic areas within the displayed results wherein the observed weather information and one or more of: (1) unedited, machine-generated past forecast information, and (2) edited, human-intervened past forecast information differ.

According to another embodiment of the present invention, systems and methods for presenting weather verification information are provided. The systems and methods for presenting weather verification information include providing a map representing a geographic region of interest, generating a graphical representation of forecast weather information relating to one or more weather parameters on the map, and integrating observed weather information into the graphical representation of forecast weather information on the map.

According to another aspect of the present invention, the systems and methods also include generating a weather forecast for the geographic region of interest for a time period of interest; color coding the graphical representation of the forecast weather information, wherein the color coding varies based on a value of the forecasted weather parameter; observing an actual value of the weather parameter being forecasted at one or more geographic locations within the geographic region of interest during the time period of interest; inserting a verification indicator representing the observed weather information directly into the graphical representation of the forecast weather information; and color coding the verification indicator, wherein the color coding of the verification indicator varies based on a value of the observed weather parameter.

According to another aspect of the present invention, the systems and methods also include using a color scale comprising different colors for different values of the weather parameter; correlating an increase in contrast in the colors to an increased difference between the weather parameter values; wherein areas within the geographic region of interest in which human forecaster intervention may be desired to edit a present weather situation are highlighted by a greater contrast in color between the observed weather information verification indicator and the graphical representation of the forecast weather information.

Additional features and advantages of the invention will be made apparent from the following detailed description of illustrative embodiments that proceeds with reference to the accompanying drawings.

BRIEF DESCRIPTION OF THE DRAWINGS

The patent or application file contains at least one drawing/photograph executed in color. Copies of this patent or patent application publication with color drawing(s)/photograph(s) will be provided by the Office upon request and payment of the necessary fee.

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 5 illustrates exemplary daily temperature verification information;

FIG. 9 shows exemplary observation narrative; and

FIG. 10 shows an exemplary presentation of comparison information for an edited forecast, a machine-generated forecast, and the observed weather for several geographic areas for a particular time period.

DETAILED DESCRIPTION OF ILLUSTRATIVE EMBODIMENTS

The present invention is a performance support system for weather forecasters that delivers feedback of past forecasts and forecast accuracy in order to optimize the human forecaster's effectiveness. This feedback process includes the comparison of forecasts to actual data of observed weather. The present invention provides the human forecaster with monitoring and verification tools to direct the human forecasters' attention to situations where the human forecaster can make a contribution to and add value to the forecast.

The systems and methods allow human forecasters to receive near real-time feedback from an array of different comparison products in order to learn from previous forecast performance and also to enable human forecasters to focus their energies and resources to those tasks that they can add value to over the machine-generated forecasts. The system provides access to verification information, including results and data, about past time periods. The time periods may include any period or interval of time, such individual days, 12-hour periods (e.g., night time and day time), an hour, a moment in time, etc. This information may be used by human forecasters to learn how they performed in past forecasts during similar situations. The systems may also provide observed weather. The systems may also include one or more databases for storing verification information, forecast tools, and other information of prior forecast performance in context of weather conditions that were observed.

The present invention provides the human forecaster with the latest and best available monitoring and verification tools to know when the machine-generated forecasts may already be good enough for public use and/or to know when to, and how best to, intervene to improve the forecast. As such, the systems and methods of the present invention provide advanced verification information to the human forecaster to allow the forecasters to improve and provide smart/improved operational results.

Figure 1:
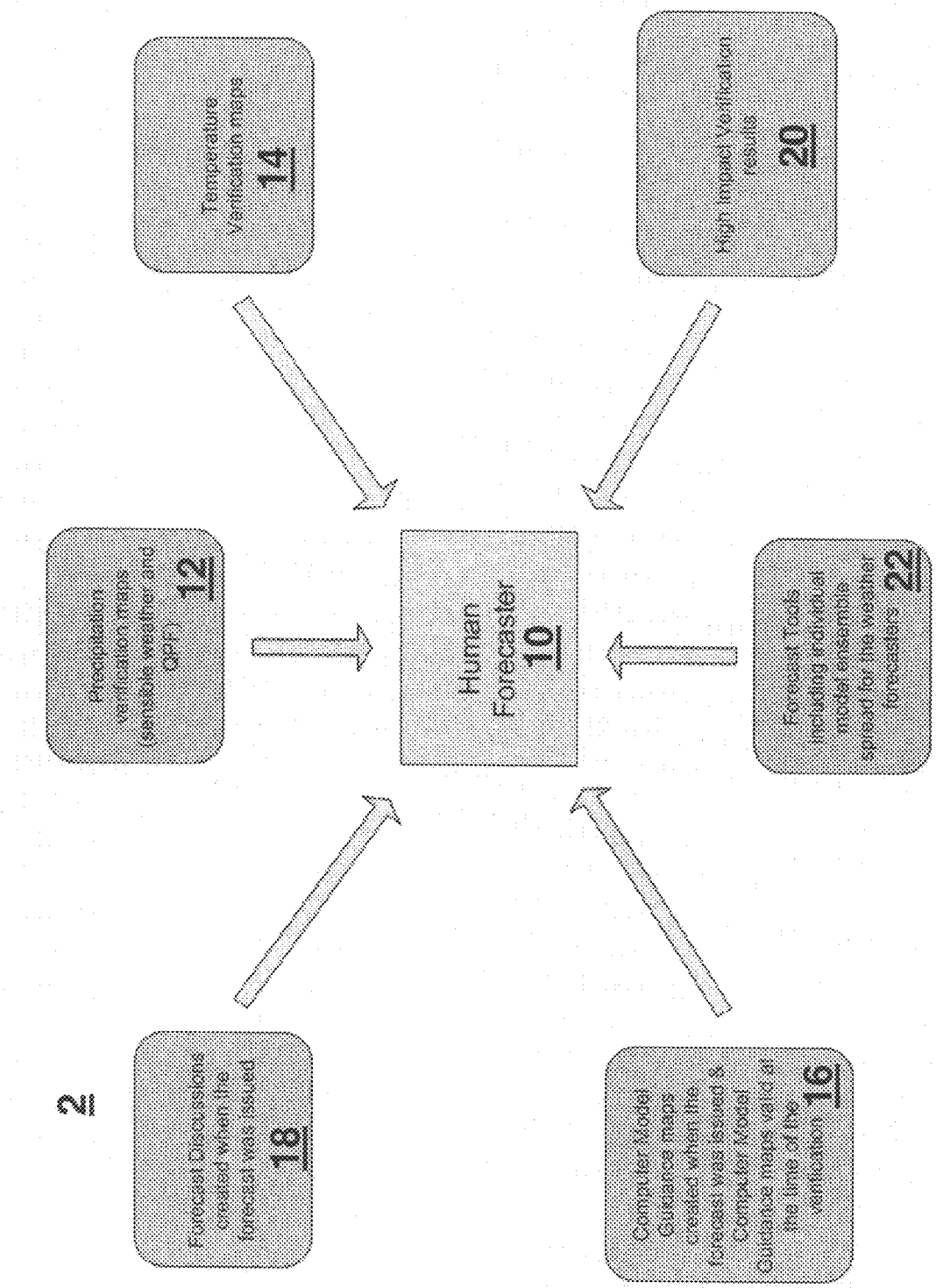
FIG. 1 illustrates an exemplary system and feedback process of weather information from a verification system to human forecasters.

FIG. 1 illustrates an exemplary system interface and feedback process 2 of weather information. The human forecaster 10 is the center of attention since one goal is to increase human intervention effectiveness. In the context of an exemplary system, the representation of the human forecaster in FIG. 1 may be thought of as any type of suitable display device for presenting information to human forecasters. The system 2 may be designed to provide support for a particular geographic area or region, such as, for example, a town, city, county, state, the northeast, the east coast, the continental United States, and the like. Preferably, the system 2 includes at least the geographic area or region that the human forecaster is responsible for providing weather forecasts for. The feedback information may also be personal to individual forecasters so that a forecaster can learn from his or her past forecasts and thus improve upon present forecasts.

Further, the systems and methods preferably provide comprehensive verification information that cover relatively large areas to one or more forecasters that are responsible for forecasting relatively large areas (e.g., national preferred over regional, regional preferred over local, etc.). This is in contrast to providing verification information for one point or a single location. Moreover, the verification information is preferably presented in a manner/format that is easy to read and quickly comprehend so that a forecaster can process large amounts of information in relatively short time periods. In this regard, the verification information is preferably presented graphically in a map format. Alternative, other presentation audio and visual formats may be used, such as alarms, tabular, lists, numerical, color coded, and the like.

As shown in FIG. 1, verification information may be presented to the human forecaster as intervention tools to determine whether or not to intervene and edit the machine-generated forecast. As used herein, verification information includes information generated from a comparison of past forecasts to observed weather for general weather parameters. Examples of verifiable weather parameters include, but are not limited to: precipitation, temperature, wind, etc. Past forecasts may include machine-generated forecasts with no human intervention (i.e., unedited forecast) and machine-generated forecasts that have been modified as a result of human intervention (i.e., edited forecast).

As shown in FIG. 1, precipitation verification information 12, including for example sensible weather and Quantitative Precipitation Forecast (QPF), may be presented to the human forecaster 10. These precipitation verification maps 12 may include information about the performance of the sensible weather for past or historical weather situations. As used herein, sensible weather means weather as a consumer sees or perceives it (e.g., rain vs. cloudy, sunny vs. snow, clear vs. partly cloudy, calm vs. windy, etc.). As such, sensible weather elements include weather elements including, but not limited to: precipitation type, wind, and sky cover. Typically, sensible weather can be represented with an icon. The performance of QPF, or the amount of precipitation forecasted (e.g., 2.13 inches vs. 3.00 inches, etc.), may be included in addition to, or in lieu of, the sensible weather to better understand the severity of the precipitation event. Past or historical data provides a prior understanding of the human forecaster past performance (i.e., how the human forecaster did a few days ago, how the human forecaster did during a past similar weather situation, etc.) and may help the forecaster to find out and understand how forecasters are forecasting a particular weather situation (e.g., a weather feature, weather event, weather system, and the like). This understanding about the past performance, in combination with the new computer model predictions about a present weather situation (e.g., a storm system), may help the forecasters make important and timely decisions about their present forecasts.

As shown in FIG. 1, temperature verification information 14 may also be presented to the human forecaster 10. The temperature verification maps 14 may follow the same logic of providing past or historical information of the human forecaster's past performance to help make decisions about the most recent temperature forecasts. These maps and past data may be useful when the weather patterns are similar over a period of a few days or if the present weather situation is similar to a past situation. Typically, the more similar the present weather is to these verification maps and past data, the more useful the verification maps are to the forecaster. In addition, the categorization by weather event of either temperature or precipitation information provides a learning tool on how the human forecaster performed in forecasting during particular weather events. In addition to this tool being useful, for example, when the weather patterns are similar over a period of time, the maps can also help identify intervention opportunities under changing weather conditions by elucidating or bringing to the attention of the human forecaster results that are unique to these situations.

Also shown in FIG. 1, computer model guidance information 16 may also be presented to the human forecaster 10. Computer model guidance maps 16 preferably follow the same logic of providing past or historical information regarding past performance to help make decisions about the current forecasts. Computer model guidance maps 16 include technical information about the atmosphere, such as, for example, 500 mb heights, 1000-500 mb thickness, surface and thickness maps, etc. These numerical weather forecasts allow human forecasters to relate specific information about the state of the atmosphere that was used at the time that the forecasts were generated with the same information that may be valid at the time of the verification. The system may display and archive surface and thickness maps of one or more computer models, such as, for example, the Global Forecast System (GFS), North American Mesoscale (NAM), and European Center for Medium range Weather Forecasting (ECMWF) models, which may be used by forecasters as a guide at the time the forecasts are generated. These computer model guidance maps 16 may be displayed next to other verification maps and forecast discussions 18. The actual model initialization map for the time of the verification may also be displayed. This may allow the forecasters to compare the map of the model they used when preparing the forecasts with the actual conditions that verified.

The systems and methods 2 of the present invention may allow the forecasters to enter forecast discussions 18 using, for example, a web interface. As used herein, a forecast discussion includes a summary of the technical aspects of the atmosphere that may be used as a guide and/or summary for other forecasters in the group which preps weather forecasts. These summaries may be used by other personnel to make meteorologically related decisions. These discussions may then be classified, displayed, and archived to the verification for each of the forecast days. For example, forecast discussions 18 may be arranged side-by-side to other verification products for readability and comparison for the forecaster. One benefit of this feature is that a forecaster may go back to a particular day and relate his or her forecast logic with the results of the verification.

The systems and methods 2 may also present high impact weather verification information 20. High impact weather verification information 20 includes geographic areas or regions where the weather made a high impact on the consumer public. High impact weather verification information 20 may include, for example, information on the violent, unusual, and/or rapidly changing weather situations, since these weather situations are the ones that typically induce the most impact on the consumer. High impact weather verification information 20 may be presented in the form of a table that lists, for example, in order of severity of observed weather how the human forecaster did during these events. High impact weather verification information 20 may be sorted/listed by location of most highly impactful weather observation/condition. This presentation helps human forecasters identify how the forecaster performed during particular weather conditions, such as the worse weather, and in those areas where the weather is worst. Forecasters can more readily learn and quickly focus their attention to those geographic areas that experienced high impact weather.

In addition, the systems and methods 2 may present forecast tools 22 to the human forecaster 10. Forecast tools 22 look to the agreement and/or disagreement of different weather forecasting models at the time of making a forecast and can be used by the human forecaster as a tool in deciding whether or not to edit the machine-generated forecast. For example, where the models are generally in agreement, the human forecaster will likely not edit the machine-generated forecast. In contrast, where the models are generally in disagreement, the human forecaster may consider editing the machine-generated forecast. As such, forecast tools 22 may be used by human forecasters as a decision support tool or verification tool to call the forecaster's attention to weather situations or geographic regions that may require attention.

Figure 2:
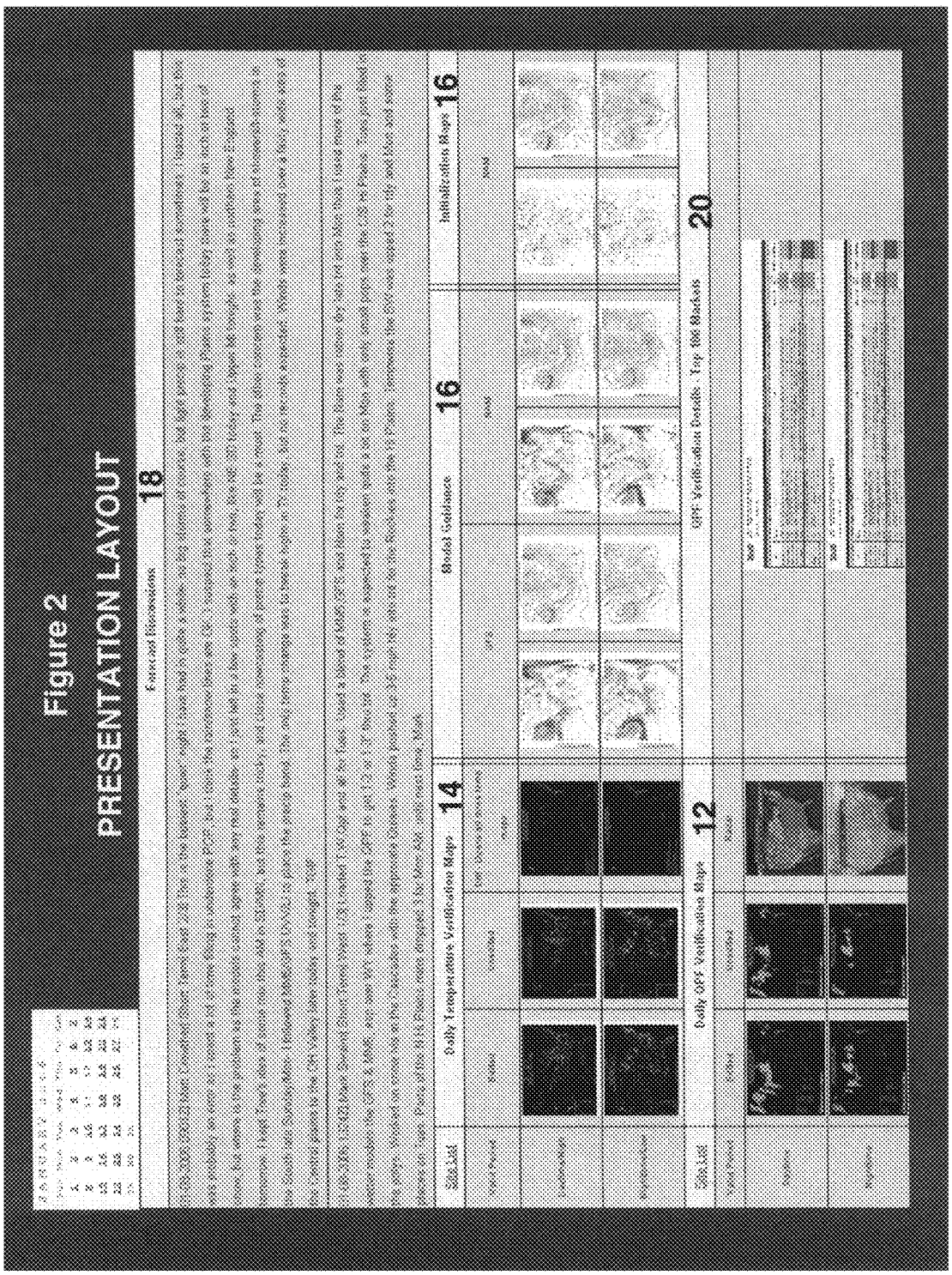
FIG. 2 illustrates an exemplary system interface of advanced verification information for improved operational results that may be presented to a human forecaster.

FIG. 2 illustrates an exemplary system interface of advanced verification information for improved operational results that may be presented to a human forecaster. As shown in FIG. 2, the information may be presented via system interface, such as a web portal, and displayed on a display device, such as a video monitor screen of a computer. Single pieces, various combinations, and possibly all available types of information may be presented to the human forecaster. As shown in the illustrated embodiment of FIG. 2, the layout of weather verification information may include forecast discussions 18, daily temperature verification maps 14, precipitation verification maps 12, computer model guidance 16—including model guidance (e.g., time of forecast) and initialization maps (e.g., time of verification), and a high impact weather verification table 20.

Figure 3:
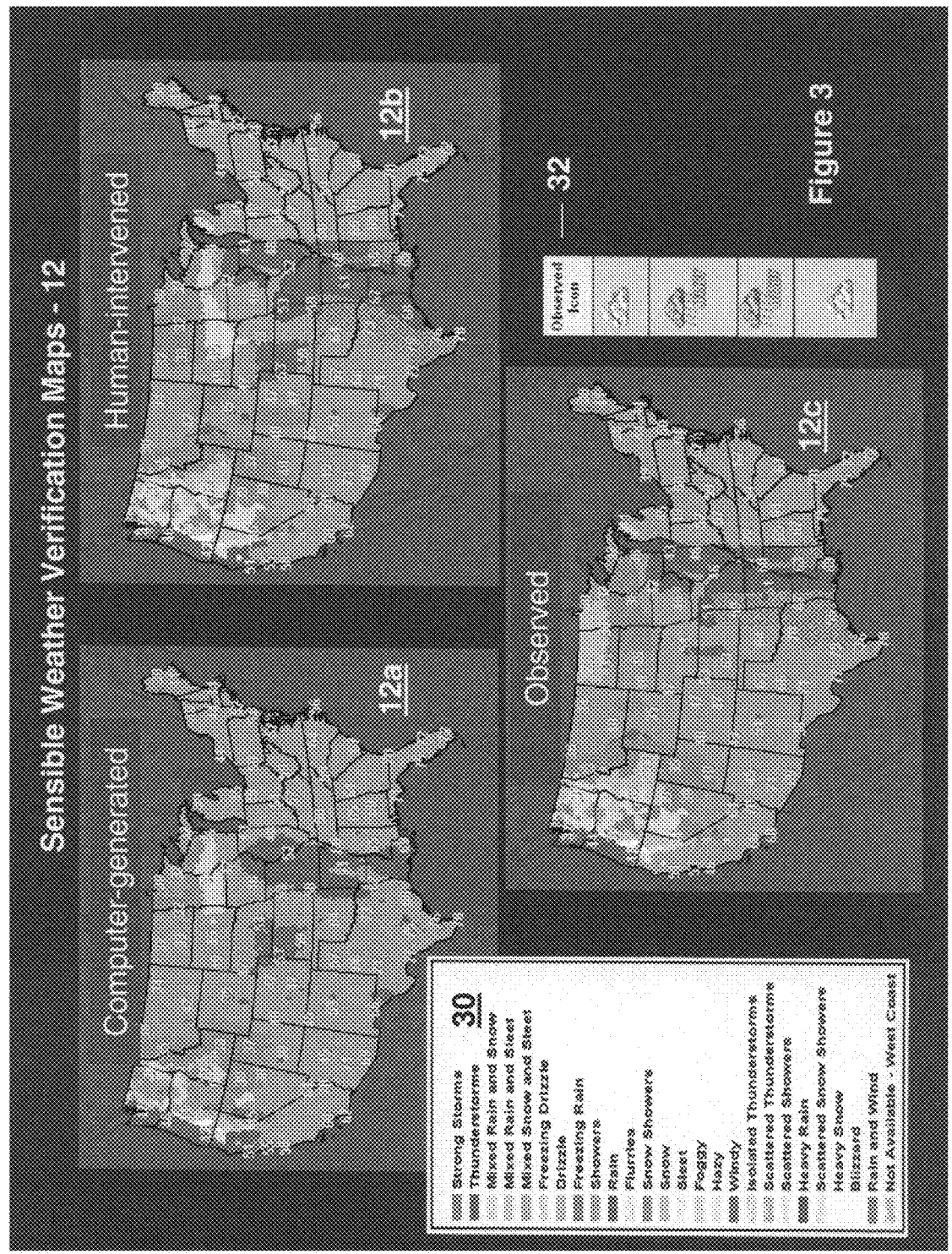
FIG. 3 illustrates exemplary daily sensible weather verification information.

FIG. 3 shows additional details of exemplary sensible weather verification maps as part of the precipitation verification information 12. Three separate sensible weather verification maps are shown in FIG. 3: the computer-generated sensible weather verification map 12a (unedited); the human-intervened sensible weather verification map 12b (edited); and the observed sensible weather verification map 12c. Map key 30 shows various types of sensible weather and is color coded to represent the different types of sensible weather listed. For example, the computer-generated sensible weather verification map 12a shows rain (dark green)/rain and wind (light green)/scattered showers (hashed light green) in the lower central portion of the United States. The human forecaster intervened and edited the machine-generated forecast to forecast thunder storms (red)/scattered thunder storms (cross hashed red) in that area of the United States (sensible weather verification map 12b). The observed sensible weather verification map 12c shows that the observed sensible weather corresponded more closely with the edited forecast, indicating that in this case the intervention of the human forecaster improved the forecast. This information may be used, for example, by the human forecaster to decide to intervene in the present forecast of a similar weather situation and to edit the machine-generated forecast in a similar manner.

Also shown in the sensible weather verification maps of FIG. 3 are temperature readings for various locations (shown numerically in yellow). Icons 32 may also be used to show sensible weather on a verification map.

Figure 4:
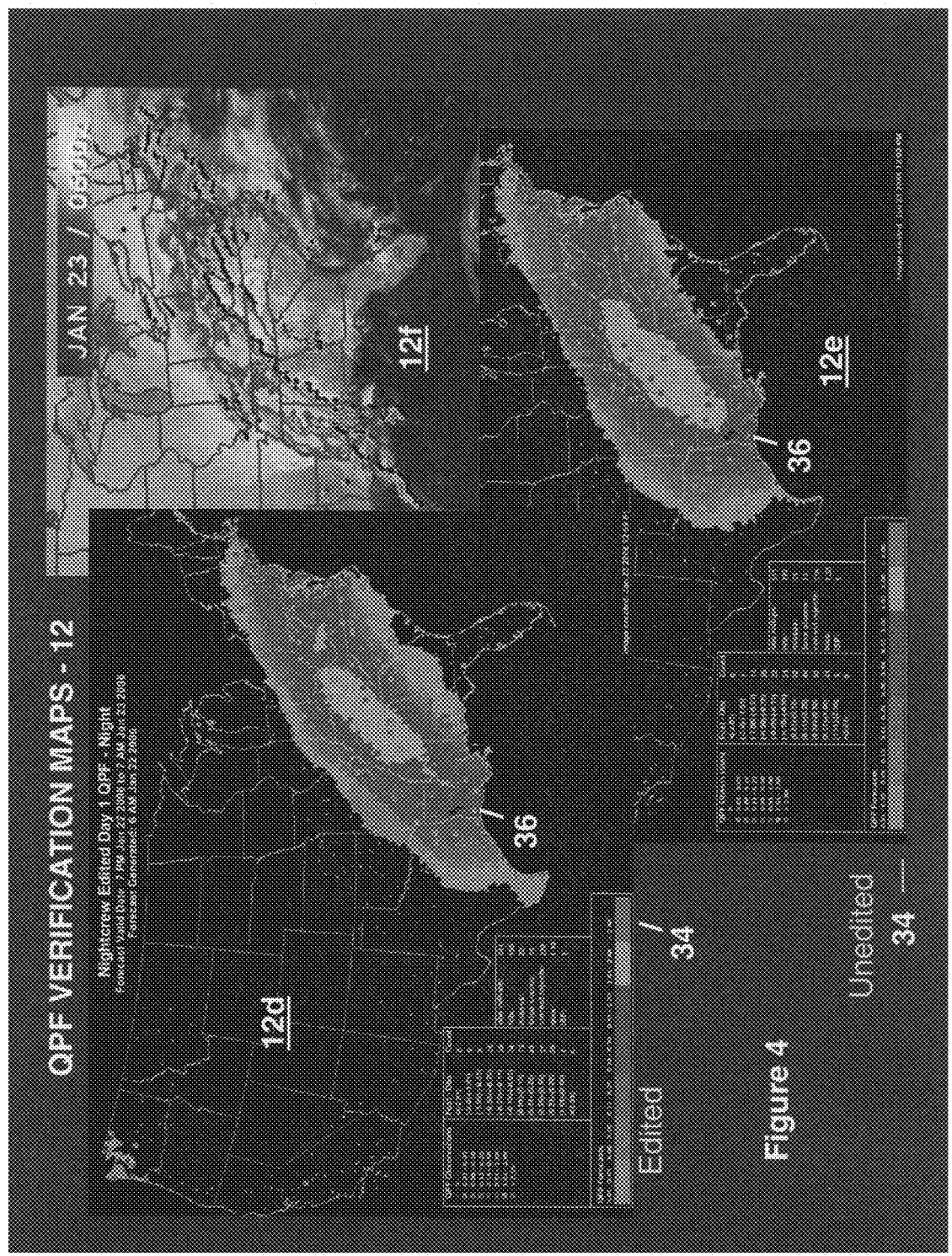
FIG. 4 illustrates exemplary daily Quantitative Precipitation Forecast (QPF) verification information.

FIG. 4 shows additional details of exemplary QPF verification maps as part of the precipitation verification information 12. Three separate QPF verification maps are shown in FIG. 4: the computer-generated QPF verification map 12e (unedited); the human-intervened QPF verification map 12d (edited); and the observed QPF verification map 12f, which may include a radar image of the weather situation at the time of validation. Presenting radar images of a weather situation may be useful to human forecasters because radar images typically include high resolution information about the state of the atmosphere and because this is one common way in which forecasters are used to seeing weather information presented. In addition to radar information, the observed weather may also utilize synthetic radar information, which displays high resolution information about the current weather conditions at more locations than only the locations with rain gauges (or ground truth information). The unedited and edited QPF verification maps show the continental United States and a storm system over the eastern/south eastern United States.

Observed amounts of rain are shown in verification indicator 36, which are shown as boxes in both the edited and unedited QPF verification maps. Observation indicator 36 may be used to represent observed or actual measurements of rain amount. Observations or actual measurements may be obtained, for example, by rain gauges or other measurement devices used to collect and measure the amount of rain. The QPF verification maps may be color coded in accordance with the exemplary map keys 34 shown. In key 34, for example, lighter amounts of rain are shown in green and heavier amounts of rain are shown in red. Verification indications (boxes) 36 may be graphically displayed over the QPF verification maps. For example, the amount of rain forecasted and observed for each location on these maps may be assigned a bin value as per the color scale 34 on the maps. Where the color in a particular box 36 matches the surrounding color, the observed or actual rain amount matched the bin value of the forecasted rain amount (e.g., the forecast was in the 0.26-0.50 bin and the observation was in the 0.26-0.50 bin). Where the color in a particular box 36 does not match the surrounding color, the observed or actual rain amount did not match the bin value of the forecasted rain amount. The color coded embodiments shown in FIG. 4 provide the human forecaster with a sliding scale along the color key and the more similar the color in a box 36 is to the color on the map surrounding that box the closer the observed amount is to the forecasted amount, and conversely, the more dissimilar the two colors are to one another, the further apart the observed amount is to the forecasted amount.

Placement and presentation of the observed or actual reading of the weather parameter (in this case quantity of rain) directly over or into the graphical forecast information provides the human forecaster with an easy to read illustration of the verification information and allows the human forecaster to make quick decisions based on prior experience regarding whether or not to intervene and edit a present weather situation. Presentation of precipitation verification information also allows human forecasters to focus their attention to those areas where disagreement is indicated.

FIG. 5 shows additional details of exemplary temperature verification maps 14. Three separate temperature verification maps are shown in FIG. 5: the computer-generated temperature verification map 14a (unedited); the human-intervened temperature verification map 14b (edited); and a performance or value added illustration temperature verification map 14c. Each of the temperature verification maps show the continental United States and a graphical representation of temperature for various locations in the illustrated graphical region. The edited and unedited temperature verification maps are color coded in accordance with the exemplary map keys 38 shown in maps 14a and 14b.

The temperature verification maps 14a and 14b show the difference between the unedited temperature forecast and the observed temperature (map 14a) and the difference between the edited temperature forecast and the observed temperature (map 14b). These temperature differentials are illustrated in maps 14a and 14b as colored dots 40. As shown in map key 38, for example, pink dots shows a temperature different of <10 degrees F., green dots show a temperature different of −3 degrees F. to +3 degrees F., red dots shows a temperature different of >10 degrees F., etc. As shown in maps 14a and 14b, the unedited and edited maps are very similar and do not shows many differences between the verification results. This may indicate that the intervention of the human forecaster in this situation did not noticeably improve the weather forecasts except for a few locations in the west.

Placement and presentation of the differential between the observed or actual reading of the weather parameter (in this case temperature) graphically over the geographic region of interest provides the human forecaster with an easy to read illustration of the verification information and allows the human forecaster to make quick decisions regarding whether or not to intervene and edit a present weather situation. For example, areas having pink and/or red dots may be quickly ascertained by the human forecaster as areas where his or her attention may have yielded improved forecasts.

Figure 6:
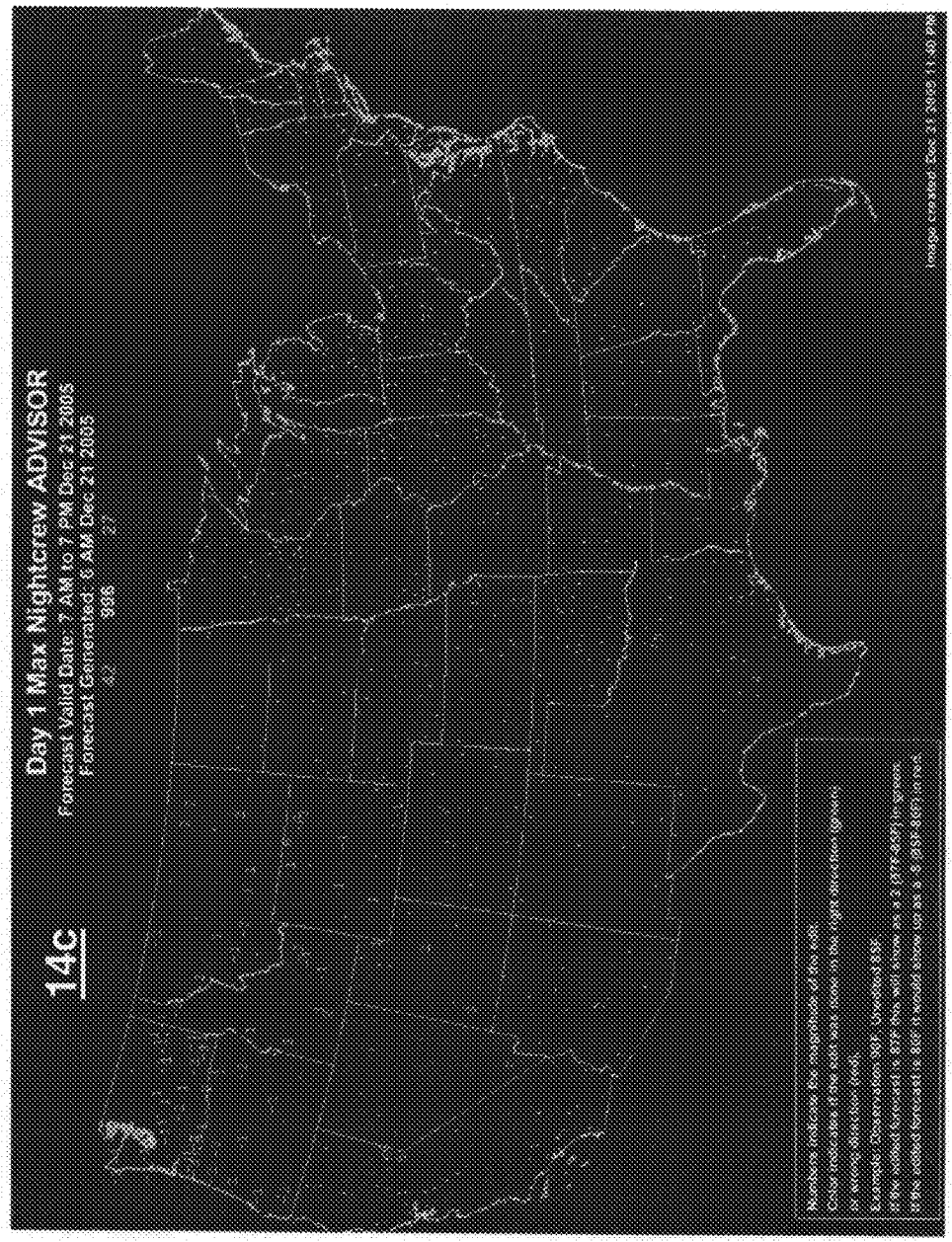
FIG. 6 illustrates an exemplary temperature verification showing persistence for a ridge over the west.

FIG. 6 illustrates further details of a temperature verification map 14c showing the value added by human forecaster intervention. As shown, numbers indicating the magnitude of the human forecaster edit are graphically represented over a verification map 14c of the continental United States. The numerical representation of the effect of the edit may be shown as positive and/or negative numbers depending on whether the edit was above or below the computer-forecasted temperature. In addition, the numerical representation may also be, for example, color coded to indicate whether the edit was done in the right direction (as indicated in FIG. 6 in green) or in the wrong direction (as indicated in FIG. 6 in red). For example, for an observation of 90 degrees F. and an unedited forecast of 85 degrees F.: (1) if the edited forecast is 87 degrees F., the graphical numerical representation of the effect of this edit may be displayed as the number "+2" (87 degrees F.−85 degrees F.) in green; or (2) if the edited forecast is 80 degrees F., the graphical numerical representation of the effect of this edit may be displayed as the number "−5" (85 degrees F.−80 degrees F.) in red. This type of persistence case study may be used to improve forecasts day to day.

FIG. 6 also shows a cumulative representation of the number of edits that improved the forecast and the number of edits that made the forecast worst. For example, the number "42," illustrated in red under the forecast valid date and time, may be used to convey to the human forecaster that 42 edits made the forecast worst. Also, the number "27," illustrated in green under the forecast valid date and time, may be used to convey to the human forecaster that 27 edits made the forecast better. The number "996" shown in yellow may indicate that 996 forecast points were not edited.

Figure 7:
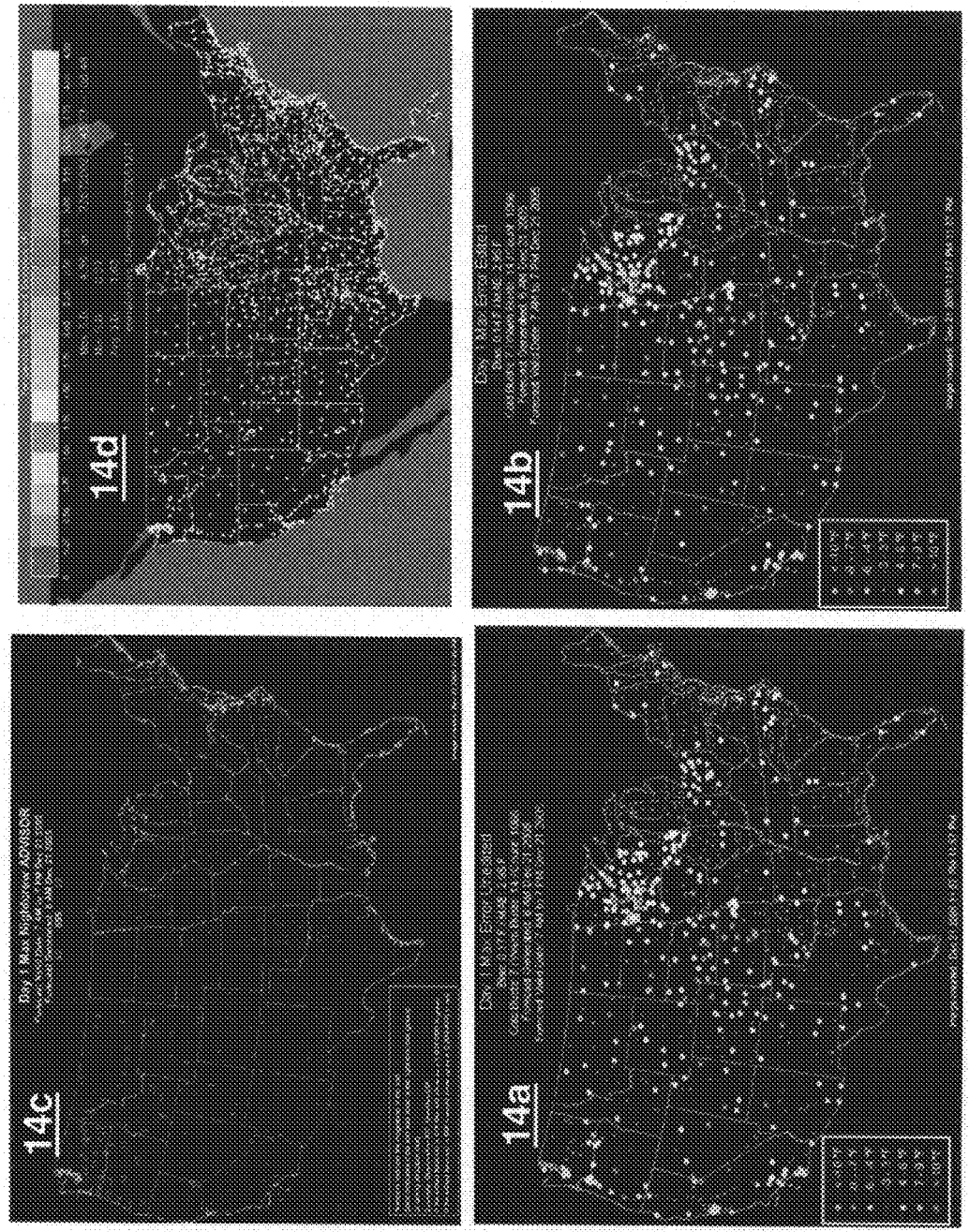
FIG. 7 illustrates a presentation of daily temperature verification information.

FIG. 7 shows the temperature verification maps presented along with an ensemble spread forecast tool represented as a map 14d. The unedited temperature validation map, edited temperature validation map, and the temperature verification map illustrating the value added by human forecaster intervention are the temperature verification maps discussed above with respect to FIGS. 5 and 6. Added to the presentation of temperature verification information 14 is ensemble spread forecasting tool. Grouping and presentation of all four of this exemplary temperature information may illustrate errors and may help validate methods. Presentation of these various forms of temperature verification information in the maps of FIG. 7 provides the human forecaster with tools to decide whether to intervene to edit the machine-generated forecast.

Figure 8:
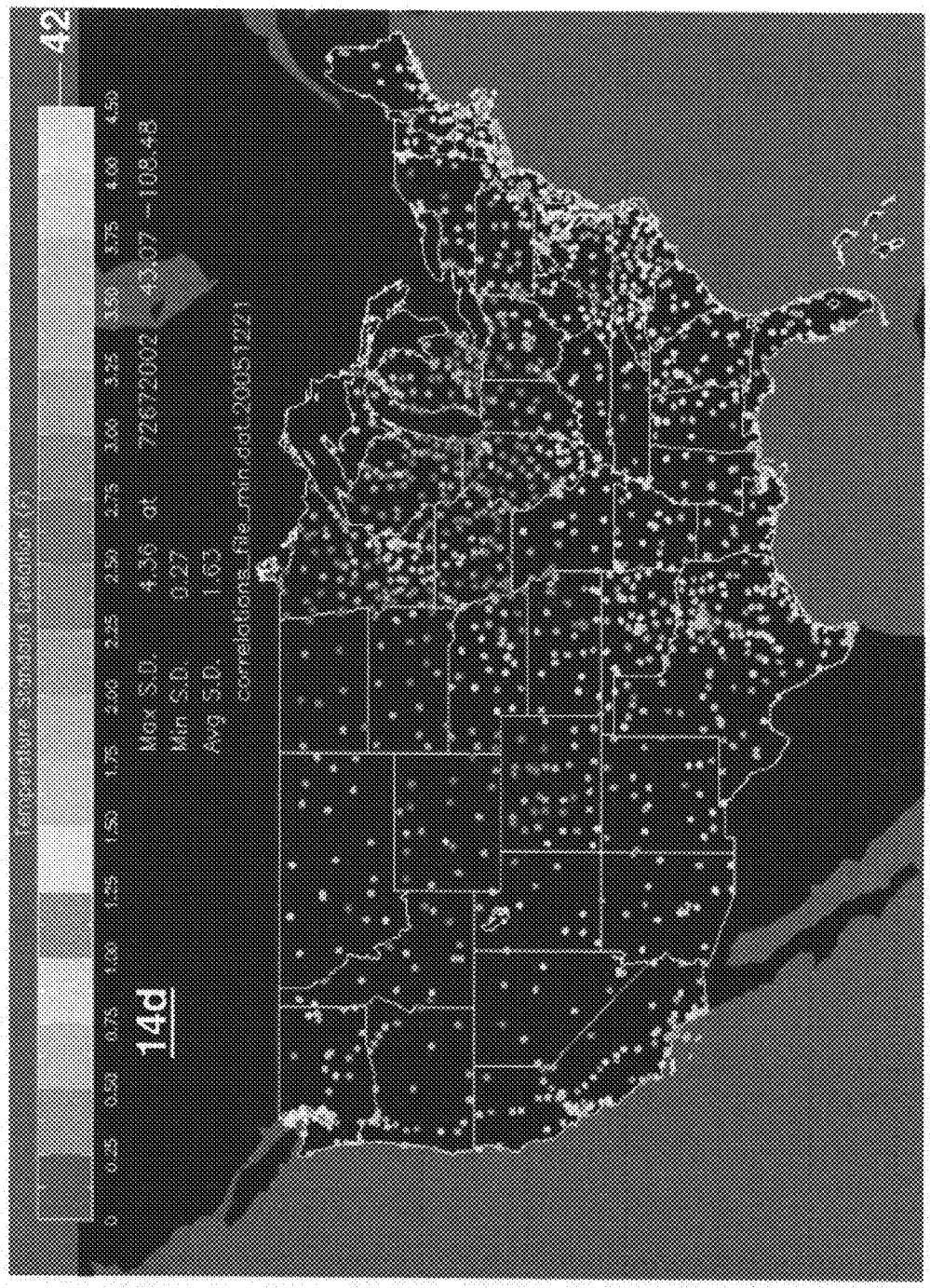
FIG. 8 illustrates exemplary daily ensemble spread for temperature.

FIG. 8 shows further details of the ensemble spread information which is a real time forecast tool that may be used by a human forecaster to identify potential areas of interest. As shown in the ensemble spread example, the ensemble spread may include a spread of forecasts from computer models that may be presented over a map 14d of the United States. Referring to key 42 across the top of FIG. 8, data illustrated in, for example, locations shown at the left of the scale in green indicate locations where the computer models were most in agreement, locations shown toward the right of the scale in pink indicate location where the models were most in disagreement, and point in between indicate varying levels of agreement/disagreement. This information may include the standard deviation of temperatures from the mean of the forecast for the various models.

An advantage of presenting verification information side by side, such as the temperature verification maps and ensemble spread map of FIG. 7, is that it provides human forecasters with a basis to establish the relationship between model spread and temperature error. Once the relationship between these two parameters is determined, a forecaster can apply this knowledge when he or she intervenes a present forecast based on the model spread (agreement or disagreement) found between the different models. For example, it has been found that when the spread is large there is a greater likelihood that there will be more error in the machine-generated forecast. Human forecasters can look at these situations and act accordingly according to their experience and the experience gained from prior comparisons between ensemble spread maps and temperature verification maps to make the best judgments when making a forecast.

Figure 9:
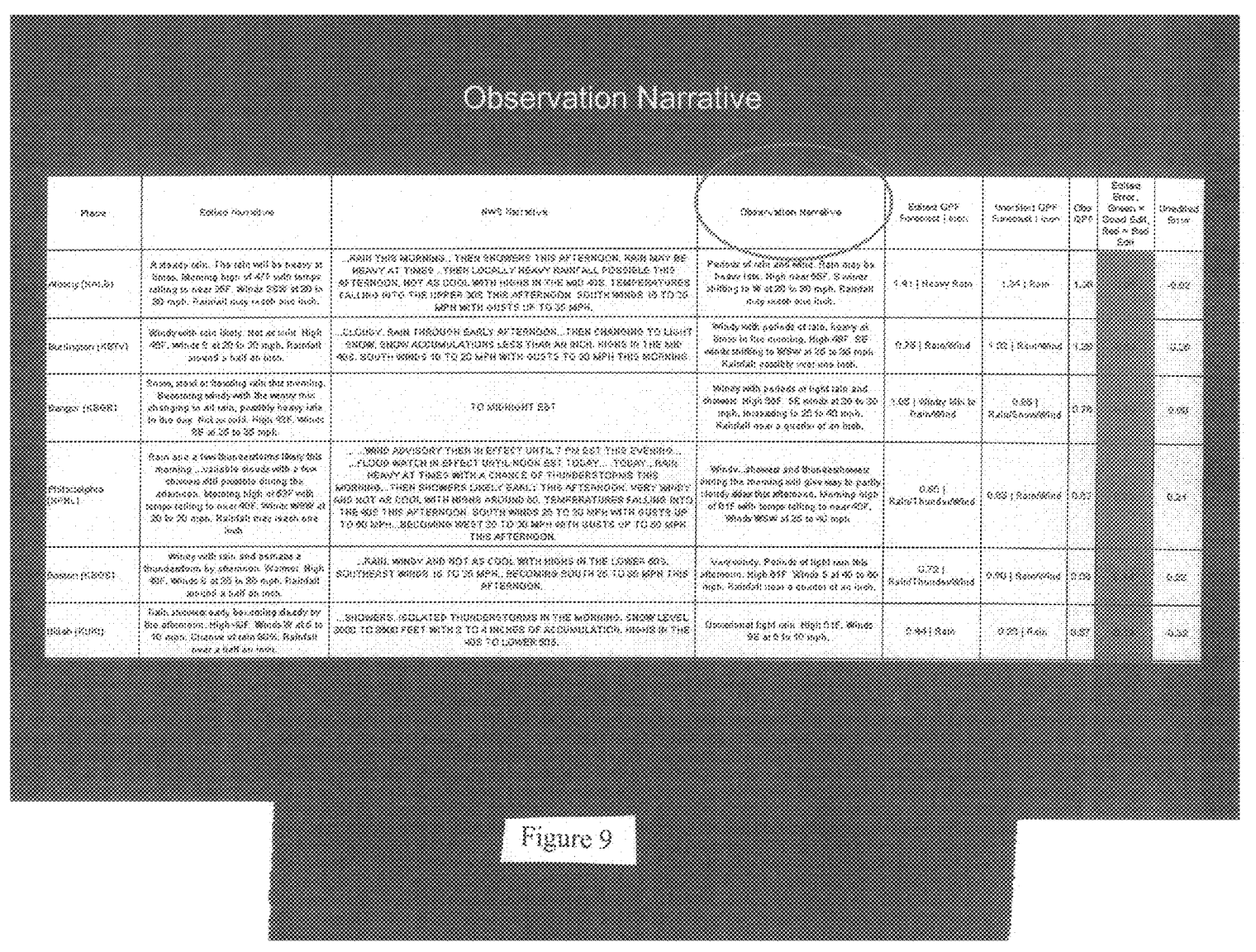

FIG. 9 shows an exemplary observation narrative that may be compiled and presented to the human forecaster. As shown, the observation narrative may include a listing of one or more places or locations of interest. For each place, the displayed information may include the edited narrative (i.e., the narrative as modified or augmented by the human forecaster), the National Weather Service (NWS) narrative (i.e., the computer generated narrative), and the observation narrative (i.e., the actual weather conditions observed for the period in question for that place).

In addition to narrative information, the system may also present quantitative and qualitative information to the human forecaster. In the illustrated embodiment of FIG. 9, this information may be presented separately from the narrative information, or preferably, qualitative information may be presented in conjunction with and along side the narrative information. As shown, the quantitative and qualitative information may include the edited QPF forecast, the unedited QPF forecast; the observed QPF; and the differences between the observed and forecasted parameter. Further, the system may present an indication of the performance of the human forecaster. As shown, the human forecaster may be presented with an indication of the edited error (i.e., the difference between the edited QPF and the observed QPF) and an indication of the unedited error (i.e., the difference between the unedited QPF and the observed QPF).

The performance indicators may provide further enhancements to convey information to the human forecaster. As shown in FIG. 9, for example, if the edited forecast improves upon the unedited forecast, then the edited error may be displayed in green and if the edited forecast is worst than the unedited forecast, then the edited error may be displayed in red. Other types of indicators (e.g., visual and audio) are contemplated and the disclosed indicators are provided as examples only and are not intended to be limiting on the scope of the invention unless expressly recited in the claims.

For example, the observation for Albany shown in FIG. 9 included an edited QPF forecast of 1.41/heavy rain, an unedited QPF forecast of 1.34/rain, and an observed QPF of 1.36. This yields an edited error of 0.05 and an unedited error of −0.02. So for Albany, the edited forecast was worse than the computer generated forecast indicating that human forecaster intervention did not improve upon the computer generated forecast and therefore did not add value to the forecast. In contrast, the observation for Boston included an edited QPF forecast of 0.72/rain/thunder/wind, an unedited QPF forecast of 0.80/rain/wind, and an observed QPF of 0.58. This yields an edited error of 0.14 and an unedited error of 0.22. So in the forecast for Boston, the edited forecast was better than the computer generated forecast indicating that human forecaster intervention improved upon the computer generated forecast and therefore added value to the forecast.

Figure 10:
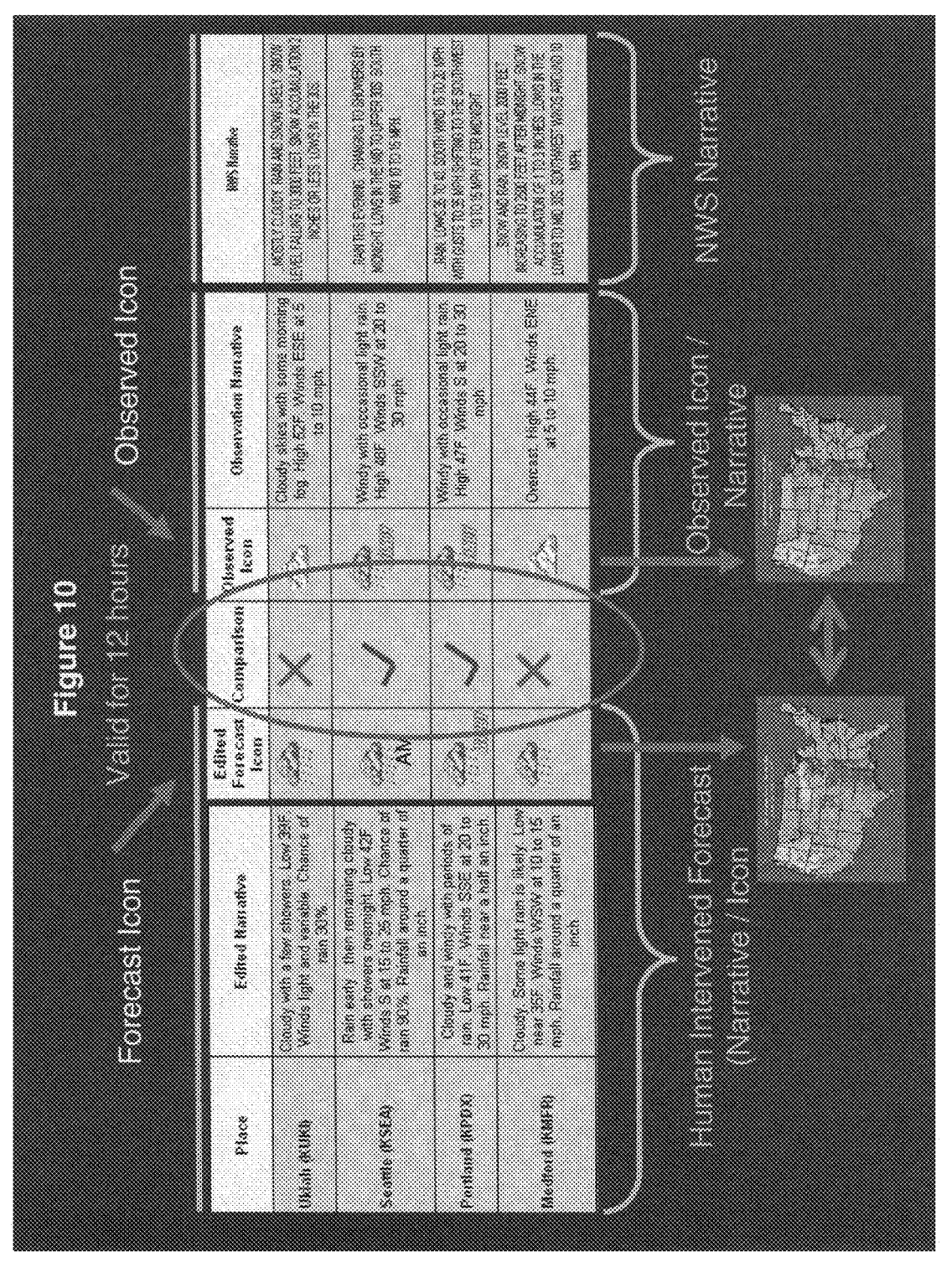

FIG. 10 illustrates another comparison tool that may be presented to the human forecaster. As shown, the human intervened forecast; the machine-generated forecast; and the observed weather may be presented for one or more geographic locations of interest. Information may be presented as narrative and/or icon. For example, the forecasts and observation may include a narrative of the forecast and/or a forecast icon. The presentation may also include a comparison indicating the performance of the human forecaster in editing the machine-generated forecast. The comparison indicator may include an icon, such as a check mark indicating agreement or an x-mark indicating disagreement. A color indication, such as the green colored check mark and red colored x-mark, may also be used to convey verification information and past performance information to the human forecaster.

In another embodiment, the systems and methods may match the forecast discussions with the verification results automatically. In one embodiment, for example, forecasters may enter the forecast discussions directly from a web interface. The forecast discussions may later be automatically parsed and matched to the corresponding verification results.

Figure 11:
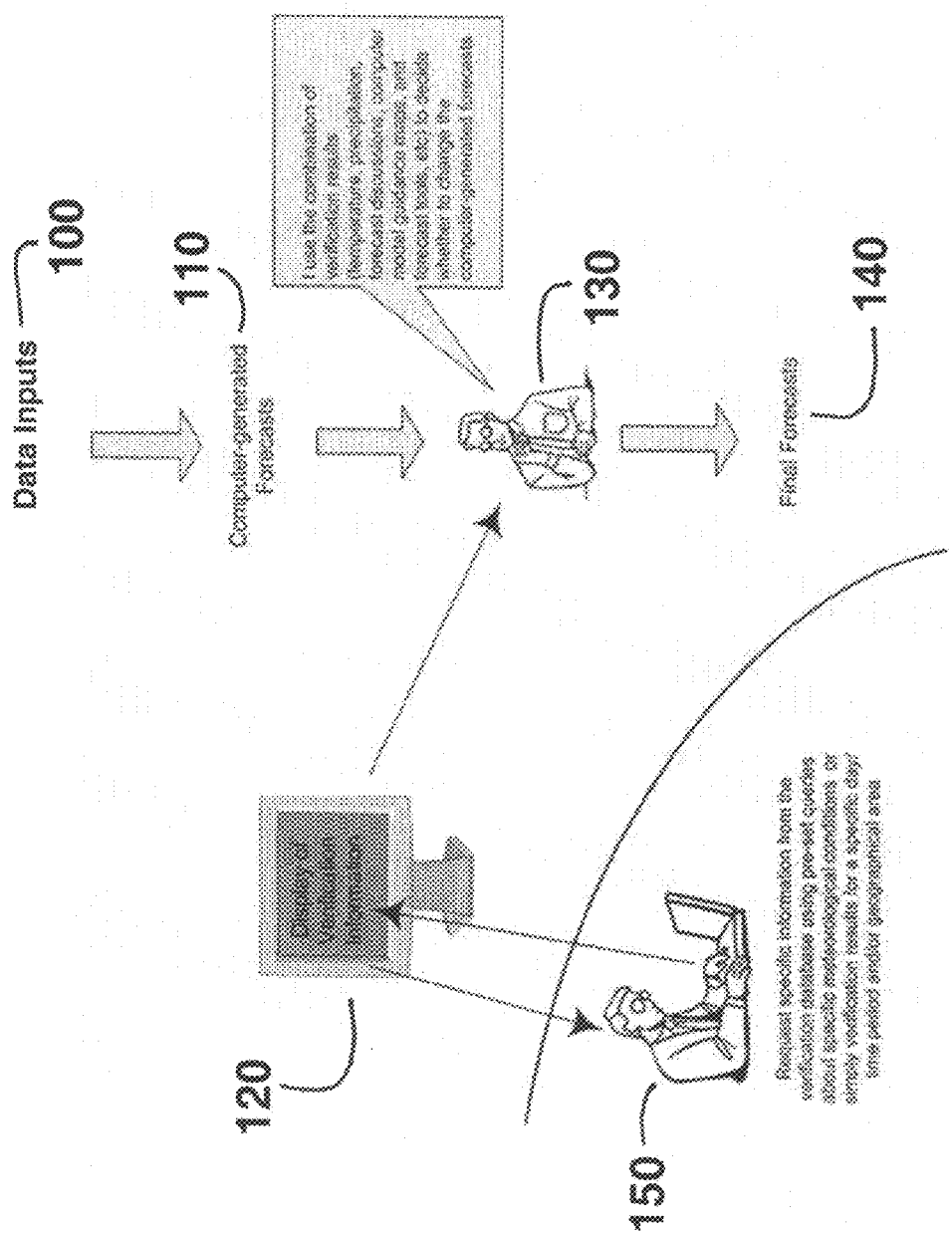
FIG. 11 shows an exemplary method of delivering and presenting real-time feedback of weather forecast information and forecast accuracy.

FIG. 11 shows an exemplary method of delivering and presenting real-time feedback of weather forecast information and forecast accuracy in order to maximize the human forecaster's effectiveness in improving operational results. As shown, weather data is received (step 100) and used by one or more forecasting models to automatically generate weather forecasts for a present weather situation, and the computer-generated forecast may be presented to a human forecaster (step 110). Weather verification information may also be presented to the human forecaster (step 120). Verification information or past forecast performance may be determined by comparing observed weather information to: (1) unedited, machine-generated past forecast information, and/or (2) edited, human-intervened past forecast information. The results of the comparison may be displayed and used by one or more human forecasters in deciding whether to intervene to edit a machine-generated forecast for a present weather situation (step 130). The human forecaster has the option of intervening and editing the computer-generated forecast or, alternatively, issuing the computer-generated forecast (step 140).

Further, at step 120, the determination of past forecast performance may include two or more of: (1) providing forecaster's discussion of prior forecast logic during a past time period for a geographic region of interest; (2) providing one or more comparison products comprising verification information of prior forecast performance during a past time period for a geographic region of interest in the context of observed weather conditions; and/or (3) providing one or more forecast tools comprising forecast information from at least two forecasting models during a time period for making a forecast for a geographic region of interest.

The method may be used to direct the human forecaster's attention to geographic areas wherein intervention by the human forecaster may contribute to and add value to the computer-generated forecast for a present weather situation by highlighting one or more geographic areas within the displayed results wherein the observed weather information and one or more of: (1) unedited, machine-generated past forecast information, and (2) edited, human-intervened past forecast information differ.

Other embodiments of the system and methods of the present invention may allow human forecasters to key in specific meteorological information about a particular weather situation, time period, and/or geographical region so that pre-set queries may be set up to access information stored in the database for similar events at a later date. As shown in FIG. 11, this feature (150) may be used to access verification information of a specific day to be linked or grouped together with verification results from other days which have one or more common meteorological parameters or features well known to weather forecasters. For example, a forecaster may want to see how they have performed regarding temperature edits during down sloping situations ahead of the Rocky Mountains. By requesting or selecting "down sloping" situations from a list of choices the human forecaster may be presented with the verification information of all prior down sloping events. This information may then be queried at a later date to learn how a forecaster performed under similar past weather situation. The result of this query may include various components of the verification information for improved operational results (e.g., temperature maps, precipitation maps, high impact verification, forecast discussions, computer model guidance maps, etc.).

Embodiments of the present invention may be used to produce useful feedback in one or more of the following areas:

The ability to compare present weather situations with past events in context of forecasters' discussions (subjective judging) and verification results (objective judging) for a particular geographic region, such as the whole country. The analysis of this data may help to focus the forecaster efforts to situations where humans can add value or the situations where humans can add the most value.

As a learning tool for the forecasters for storing and presenting verification statistics for a particular geographic region and/or a particular time period. Also, the classification of the data by importance of meteorological events (e.g., extreme events versus fair weather) may allow forecasters to learn in context of types of weather conditions.

The capability to determine after which day of the forecast it becomes difficult for human forecasters to add value in reference to the guidance used by individual forecasters and/or forecast providers. This allows human forecasters to focus their efforts to, for example, short term forecasts and extreme events.

Motivate an open dialog between forecasters, managers, scientists, and engineers of the end-to-end forecast system with the goal of maximizing efficiency and improving forecasts.

The capability to provide monitoring and verification tools in a decision support system that provides the human forecaster access to more information with which to make better/smarter decisions regarding forecasting. The monitoring and verification tools allow a forecaster to decide how, when and where to intervene to edit and improve computer-generated forecasts. Assisting in the identification of problem areas (i.e., areas where the computer tends to generate bad forecasts and/or areas of severe weather) and lets human forecaster focus attention to those identified problem areas and allow forecasters to maximize the use of a limited amount of time in which to decide whether or not to intervene and edit the computer-generated forecast.

The capability to highlight potential problem areas and allow human forecasters to focus limited resources and make near real-time decisions regarding weather forecasts. For example, whether to load the computer data, modify the computer data and load, and/or load a previous modification.

The ability to improve consumer satisfaction. Consumers generally notice and care about weather type. Consumer can also generally tell whether a forecast was good or bad. The present invention provides tools that allow human forecaster to learn from past forecasting performance and make smart decisions regarding a present forecasting process, leading to improved operational results and hence improved consumer satisfaction.

The ability to identify needed engineering improvements in the end-to-end forecast system.

While the present invention has been described in connection with the preferred embodiments of the various Figures, it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A system for presenting verification information to human forecasters for improved weather operational results comprising:
   a database storing weather parameter information of past weather situations for a geographic region and a time period of interest;
   a processor that accesses said past weather parameter information and determines past verification information; and
   a display for presenting said verification information for more than one weather parameter to a human forecaster, for comparison of said past verification information to a present weather situation, wherein said comparison allows said human forecaster to determine whether to intervene to edit a machine generated forecast for said present weather situation,
   the display including a first, second and third visual rendering of a map representing a geographic region, the first visual rendering including the machine generated forecast, the second visual rendering including the verification information, and the third visual rendering including an output forecast, the output forecast displaying a numerical representation of the effect of the edit to the machine generated forecast by said human forecaster,
   wherein said numerical representation includes a magnitude, the magnitude being one of: a positive number if an edited value of at least one weather parameter was above a machine generated weather parameter, or a negative number if the edited value of the at least one weather parameter was below the machine generated weather parameter, and
   wherein said numerical representation further comprises a color code to indicate whether said edit moved the forecast in the right direction, wherein a first color indicates that the edit moved the forecast in the right direction and improved the forecast, and a second color indicates that the edit moved the forecast in the wrong direction and made the forecast worse.

2. The system of claim 1, wherein said weather parameter information further comprises at least one of an unedited past weather parameter information, an edited past weather parameter information, or an observed past weather information.

3. The system of claim 1, wherein said verification information further comprises at least one of a comparison of unedited, machine-generated forecasts to observed conditions; or a comparison of edited, human-intervened forecasts to observed conditions.

4. The system of claim 1, wherein said operational result comprises a weather forecast; and said displayed past verification information comprises feedback from an array of different comparison products that may be used by said human forecaster to improve said forecast.

5. The system of claim 4, wherein said array of different comparison products further comprises at least one of precipitation verification information; temperature verification information; computer model guidance information; high impact verification information, or forecast discussions.

6. The system of claim 5, wherein said precipitation verification information further comprises at least one of precipitation verification maps displaying information on the performance of sensible weather or Qualitative Precipitation Forecast (QPF) for past weather situations.

7. The system of claim 5, wherein said temperature verification information further comprises temperature verification maps displaying information on the performance of temperature for past weather situations.

8. The system of claim 5, wherein said computer model guidance information further comprises computer model guidance maps displaying technical information about the state of the atmosphere that was used at the time that the forecasts were generated with the same information that may be valid at the time of validation.

9. The system of claim 5, wherein said high impact verification information further comprises high impact verification results of the geographic regions where weather made a high impact on the consumer public.

10. The system of claim 5, wherein said forecast discussions further comprises narrative entered by a human forecaster that are classified and archived to the verification for each of the forecast days allowing said human forecaster to review and relate forecast logic with the results of the verification.

11. The system of claim 1, further comprising forecast tools that may be presented to a human forecaster via said display device, wherein said forecast tools compare different forecasting models and look to at least one of an agreement or disagreement of said forecasting models at the time of making a forecast, wherein said forecasting tools may be used by said human forecaster as a tool in deciding whether or not to edit a machine-generated forecast for said present weather situation.

12. The system of claim 1, wherein the second visual rendering of a map represents a relatively large geographic region of interest, wherein said second map comprises at least one of an unedited, computer-generated verification map; an edited, human-intervened verification map; or an observed verification map.

13. A system for presenting verification information to human forecasters for improved weather operational results comprising:
  a database storing weather parameter information of past weather situations for a geographic region and a time period of interest;
  a processor that accesses said past weather parameter information and determines past verification information;
  a display for presenting said verification information for more than one weather parameter to a human forecaster for comparison of said past verification information to a present weather situation, wherein said comparison allows said human forecaster to determine whether to intervene to edit a machine generated forecast for said present weather situation; and
  a map displaying a numerical representation of the effect of an edit to a machine-generated forecast by the human forecaster;
  wherein said numerical representation includes a magnitude, the magnitude being one of: a positive number if an edited value of at least one weather parameter was above a machine-generated weather parameter, or a negative number if said edited value of said at least one weather parameter was below said machine-generated weather parameter; and
  wherein said numerical representation further comprises a color code to indicate whether said edit moved the forecast in the right direction, wherein a first color indicates that the edit moved the forecast in the right direction and improved the forecast, and a second color indicates that the edit moved the forecast in the wrong direction and made the forecast worse.

14. A system for presenting verification information to human forecasters for improved weather operational results comprising:
  a database storing weather parameter information of past weather situations for a geographic region and a time period of interest;
  a processor that accesses said past weather parameter information and determines past verification information; and
  a display for presenting said verification information for more than one weather parameter to a human forecaster for comparison of said past verification information to a present weather situation, wherein said comparison allows said human forecaster to determine whether to intervene to edit a machine generated forecast for said present weather situation;
  ensemble spread information, wherein said ensemble spread information being used by a human forecaster as a forecast tool to identify potential areas of interest upon a determination to intervene and edit machine-generated forecasts, said ensemble spread information including:
  a map of a geographic region of interest; and
  a spread of forecasts from computer models presented over said map, wherein said spread of forecasts are represented as standard deviation of one or more weather parameters being forecasted by said models;
  wherein a low standard deviation between said computer models is indicative of agreement between said models and wherein a high standard deviation between said models is indicative of disagreement between said models, wherein areas showing disagreement between the models would identify potential areas of interest to human forecasters, and
  the map displaying a numerical representation of the effect of an edit to a machine-generated forecast by the human forecaster,
  wherein said numerical representation includes a magnitude, the magnitude being one of: a positive number if an edited value of at least one weather parameter was above a machine-generated weather parameter, or a negative number if said edited value of said at least one weather parameter was below said machine-generated weather parameter; and
  wherein said numerical representation further comprises a color code to indicate whether said edit moved the forecast in the right direction, wherein a first color indicates that the edit moved the forecast in the right direction and improved the forecast, and a second color indicates that the edit moved the forecast in the wrong direction and made the forecast worse.

* * * * *